United States Patent [19]

Harris

[11] Patent Number: 4,528,456
[45] Date of Patent: Jul. 9, 1985

[54] DUAL LOAD CONTROL CIRCUIT

[75] Inventor: Dewey L. Harris, Coventry, R.I.

[73] Assignee: General Electric Company, Schenectady, N.Y.

[21] Appl. No.: 544,022

[22] Filed: Oct. 20, 1983

[51] Int. Cl.³ .............................. H02J 3/2; H02P 7/00
[52] U.S. Cl. ........................................ 307/31; 307/38;
307/115; 307/140; 323/905; 315/291; 318/138;
318/254
[58] Field of Search .............. 307/31, 38, 140, 252 B,
307/113, 115; 315/DIG. 4, 210, 291; 323/327,
905; 318/138, 254

[56] References Cited

U.S. PATENT DOCUMENTS

| 3,527,957 | 9/1970 | Eck | 307/140 |
|---|---|---|---|
| 3,558,922 | 1/1971 | Galloway | 307/252 B |
| 4,008,416 | 2/1977 | Nakasone | 323/327 X |
| 4,322,632 | 3/1982 | Hart et al. | 307/252 B |
| 4,465,956 | 8/1984 | Fowler | 307/115 X |
| 4,491,772 | 1/1985 | Bitting | 318/138 X |

OTHER PUBLICATIONS

Dual Load Remote Power Control by W. Peil, Ser. No. 06/#25552.

Primary Examiner—A. D. Pellinen
Assistant Examiner—Derek S. Jennings
Attorney, Agent, or Firm—Nathan D. Herkamp; Philip L. Schlamp; Fred Jacob

[57] ABSTRACT

A control circuit provides full range power control to a pair of electrical loads via a single two-wire power cable by controlled switching of a bidirectional solid state switch during each consecutive half-wave cycle to supply power to one load during each positive half-wave cycle and to the other load during each negative half-wave cycle. The switching during each half-wave cycle is controlled by a respective trigger circuit. Interference by power supplied to one load with the operation of the other load is prevented by removing any residual voltage from the respective trigger circuit at the end of each half-wave cycle.

10 Claims, 3 Drawing Figures

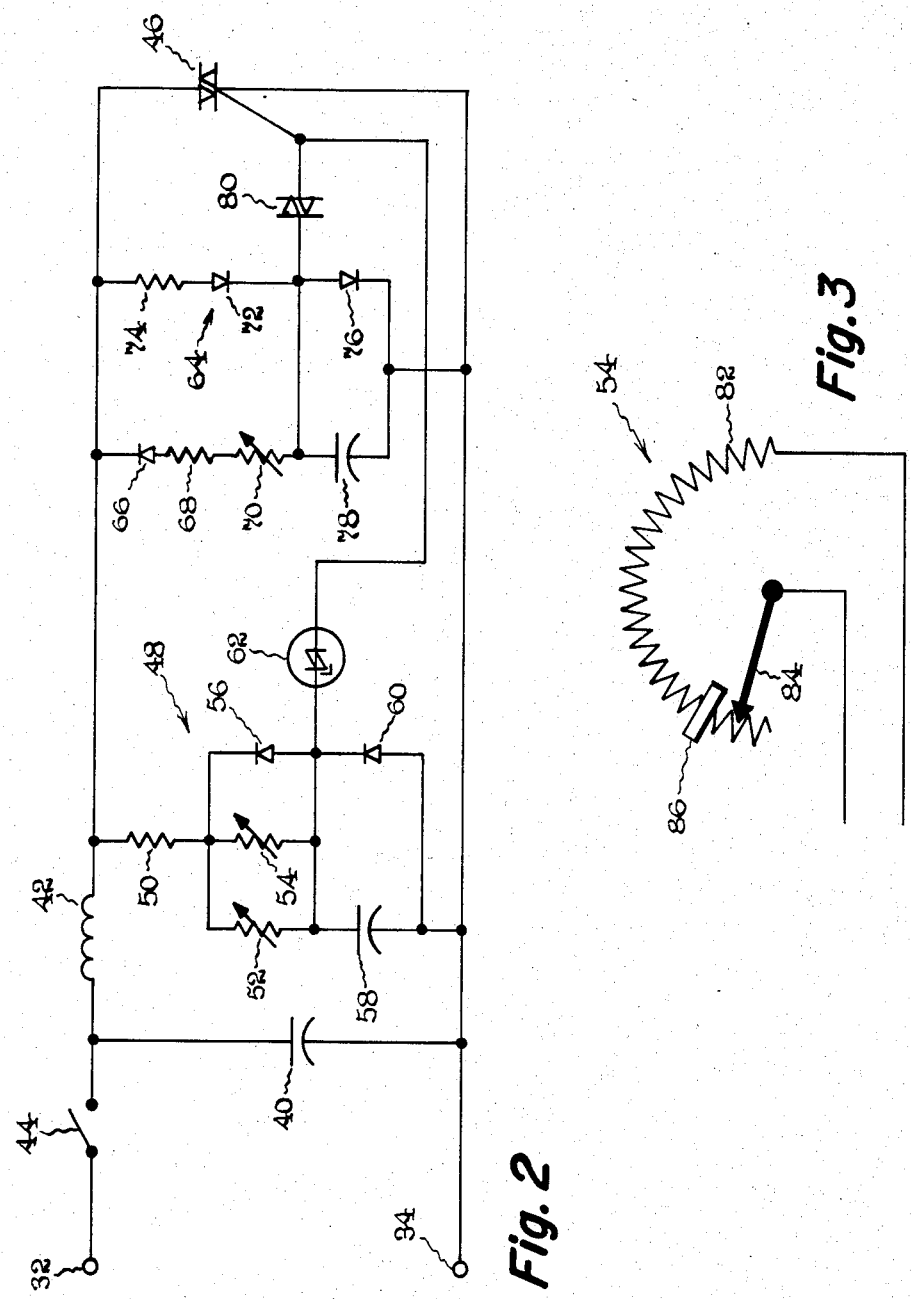

DUAL LOAD CONTROL CIRCUIT

BACKGROUND OF THE INVENTION

1. Field of the Invention

This invention relates to solid state electric power controllers, and, more particularly, to a power controller which utilizes a single solid state control device to control the supply of electrical power to each of the separate loads.

2. Description of the Prior Art

The invention is drawn to a dual controller mounted in a conventional switch box and using the standard single hole cover plate, and to a circuit for dual control from a single solid state device. By using the existing electrical wiring connecting a wall switch to a ceiling light and a ceiling fan and using a single solid state control device, the present invention facilitates retrofit of a dual controller to an existing installation.

A prior art dual controller is disclosed and claimed in U.S. patent application Ser. No. 425,552, filed by William Peil on Sept. 28, 1982 and assigned to the present assignee, in which separate controls and control circuits are provided for the separate loads being controlled.

SUMMARY OF THE INVENTION

An object of the present invention is to provide a dual load control for independently controlling the electrical power supplied to each of a pair of electrical loads.

A more specific object of the present invention is to provide a dual load control circuit in which a single switching device is used to control the power supplied to each of a pair of electrical loads.

Accordingly, the present invention includes a dual load control circuit in which a single switching device is controlled by a first trigger circuit to provide electrical power to a first load during the positive half-wave cycles of an a-c power supply and is controlled by a second trigger circuit to provide electrical power to a second load during the negative half-wave cycles.

BRIEF DESCRIPTION OF THE DRAWINGS

Further objects and advantages of the present invention together with its organization, method of operation and best mode contemplated may best be understood by reference to the following description taken in conjunction with the accompanying drawings, in which like reference characters refer to like elements throughout, and in which:

FIG. 2 is a circuit diagram illustrating the dual load control system of the present invention; and FIG. 3 is a schematic diagram showing a control potentiometer of the present invention.

DESCRIPTION OF THE PREFERRED EMBODIMENTS

Figure 1:
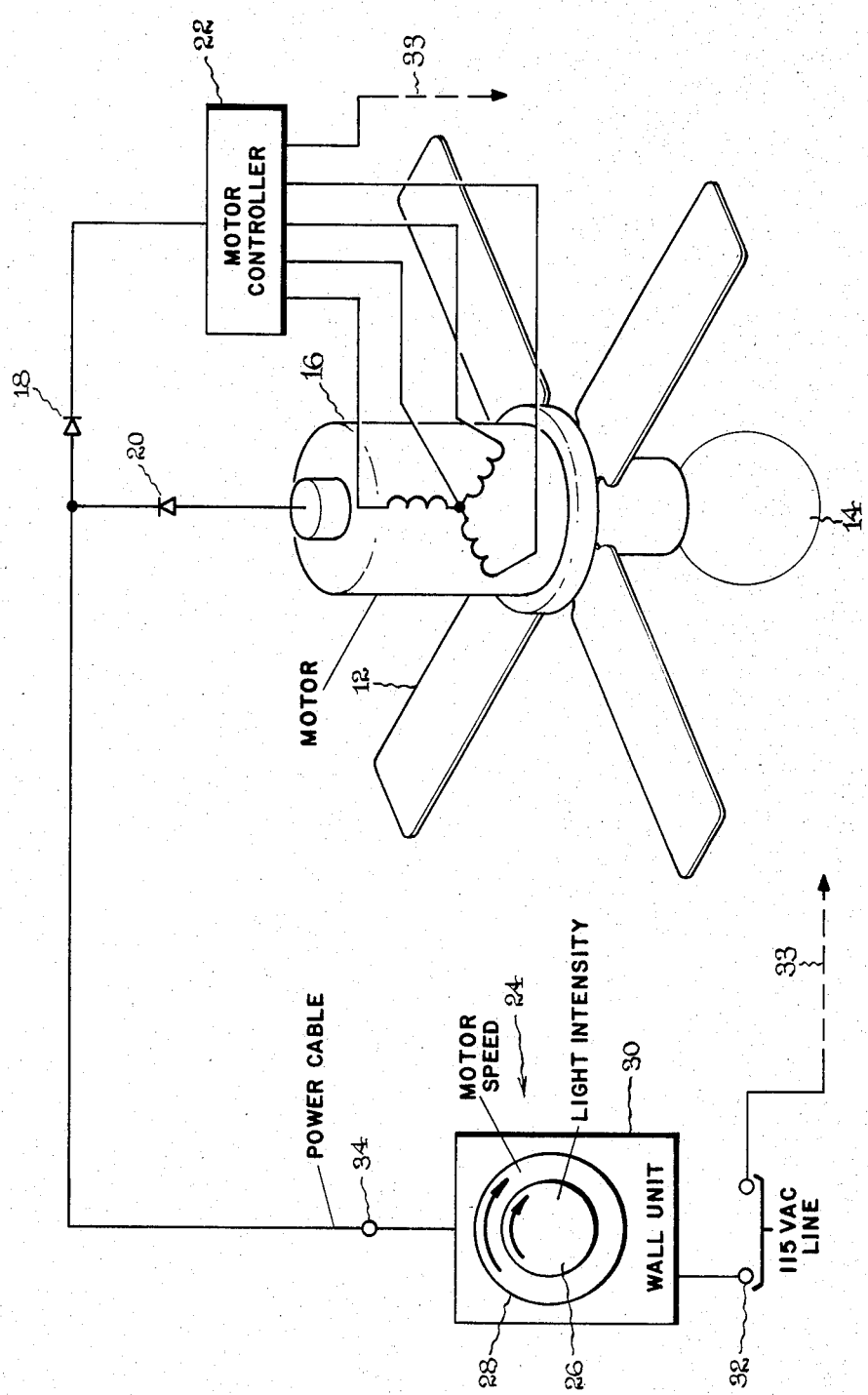
FIG. 1 is a schematic block diagram illustrating the dual load control system including the present invention.

In the dual load control system 10 shown in FIG. 1, the dual load consists of a fan 12 and a lamp 14. Fully independent load controls are required in order to accommodate any desired operation of the dual load; i.e., the lamp operating over its full intensity range from off to full brightness with the fan operating independently at any desired speed from off to full speed, without any interference upon the operation of one load by the other regardless of the operating condition or change of operating condition of the other load. The fan motor 16 may be an electronically commutated motor receiving inputs from the controller 22, or another suitable type motor. The lamp 14 may be an incandescent or other suitable type lamp. The input electrical power for the lamp 14 and the fan 12 are provided via wall control 24. The wall control 24 includes a rotatable knob 26 for controlling intensity of the lamp 14 by controlling the electrical power output to the lamp and another rotatable knob 28 for varying power supplied to the motor windings for controlling motor speed. By using concentric control knobs 26, 28 mounted on concentric shafts connection of both knobs may be made through a single hole in the wall plate 30 to circuit elements mounted behind the wall plate.

The circuit for providing the independent control is shown schematically in FIG. 2. An a-c power supply is connected to the terminals 32, 33. The output terminal 34 is connected to the power cable shown in FIG. 1. Capacitor 40 and inductor 42 act as a filter to reduce the radio frequency interference commonly generated during phase control of a triac. Switch 44 is a master power switch for the ECM wall control and the ECM controller and is actuated by rotating the knob 26 of FIG. 1, as described below.

A solid state switch 46, such as a triac, is used to provide controlled inputs to the fan and lamp via the power cable. The triac 46 can be closed at any point during a half-wave cycle to vary the power transmitted. The triac automatically opens at the end of each half-cycle. Two separate triac trigger circuits are used in the present invention to allow independent control of the closing of the triac and therefore independent control of the power transmitted during each half-cycle.

The fan trigger control circuit 48 includes resistor 50 connected to inductor 42 and in series with the parallel combination of variable resistors 52, 54, and diode 56. The parallel combination of capacitor 58 and diode 60 is connected at one junction in series with the parallel combination of resistors 52, 54 and diode 56 and at the other junction to output terminal 34. The fan trigger control circuit 48 also includes diac 62 connected between the junction between the parallel combinations and to the gate of triac 46.

The lamp trigger control circuit 64 connected to inductor 42 includes the series combination of diode 66, resistor 68, and variable resistor 70, connected in parallel with a series combination of diode 72 and resistor 74. Connected to the junction of resistor 70 and diode 72 is the parallel combination of diode 76 and capacitor 78 and diac 80 connecting the same junction with the gate of triac 46. The other junction of diode 76 and capacitor 78 is connected to output terminal 34.

The operation of the control circuit will now be described. Switch 44 is closed by rotation of knob 26 past a predetermined position to apply electrical power to the trigger circuits 48 and 64, which control the switching of triac 46 to provide power respectively to the fan during positive half-cycles and to the lamp during negative half-cycles. During positive half-wave cycles, the voltage across capacitor 58 increases at a rate determined by variable resistors 52 and 54. When the voltage across capacitor 58 exceeds 16 volts, diode 62 starts conducting and causes triac 46 to start conducting, thereby supplying power via output terminal 34 to the fan 12. Triac 46 continues to supply power to the fan motor via diode 18 until the voltage across the triac drops to zero turning off the triac. When the voltage input decreases to zero, the triac 46 is turned off, and any voltage remaining across capacitor 58 is drained via the lamp or a bypass resistor in parallel with the lamp (not shown) and diodes 60 and 56 through resistor 50. The current through the lamp is low enough that lamp operation is not affected. This eliminates any variation in fan speed from cycle to cycle, because the voltage on capacitor 58 always starts each cycle at the same value. The resistor 52 is preset during manufacturing to provide a minimum power level to the ECM controller 22 which is required by the controller characteristics to prevent erratic controller output. Resistor 54 is a potentiometer connected to the larger concentric knob 28, and as shown in FIG. 3 comprises an arcuate resistive element 82 with a rotatable contact 84. A slot 86 in the resistive element 82 provides for control of the minimum power level by rotation of knob 28 past the slot position. At contact positions counterclockwise of slot 86, the resistor 54 is an open circuit and has no effect upon the fan speed. The motor controller is so configured that each time the contact 84 is moved past slot 86, i.e., to minimum power level, the fan rotational direction is reversed. At clockwise rotations of greater than the position of slot 86 (about 30°), the conductive element 82 is switched into the fan trigger circuit. This causes a sudden increase in the power level transmitted to the ECM controller 22. The resistance value of element 82 is selected so that the switching of resistor 54 into the circuit causes fan 12 to start rotating slowly. At the full clockwise position of contact 84, the resistor 54 is a short circuit and the fan speed is a maximum dictated by the value of resistor 50. In a particularly preferred embodiment of the circuit 48, resistor 50 has 20K ohms resistance, resistor 52 has 1.0 megohms resistance, and potentiometer 54 has 500K ohms resistance, capacitor 40 is a 0.1$\mu$Fd capacitor, and capacitor 58 is a 0.15$\mu$Fd capacitor. Diac 62 is an asymmetrical trigger diode which switches on at 16 volts to trigger triac 46. This circuit allows full range fan speed control with no interference with the lamp power supply circuit.

During negative half-wave cycles, diode 66 allows the voltage across capacitor 78 to increase at a rate determined by potentiometer 70. When the voltage across capacitor 78 exceeds 32 volts, diode 80 starts conducting, triggering triac 46 to start conducting, thereby supplying power via diode 20 to the lamp 14. When the voltage across triac 46 falls to zero, the triac turns off. During positive half-wave cycles, any voltage remaining across capacitor 78 drains off via the lamp controller and diodes 72 and 76 through resistor 74, so that the voltage build-up across capacitor 78 begins at the same voltage for each cycle. In a particularly preferred embodiment of the circuit 64, resistor 68 is a 20K ohm resistor, resistor 74 is an 82K ohm resistor, potentiometer 70 has 500K ohm resistance, capacitor 78 is a 0.056$\mu$Fd capacitor, and diode 80 is a symmetrical trigger diode which switches on at 32 volts to trigger triac 46. The circuit then repeats the operation of circuit 48 for each positive half-wave cycle and the operation of circuit 64 for each negative half-wave cycle in sequence throughout operation of the system. The draining of voltage from each of the capacitors during each cycle ensures complete isolation of the power supply to each of the loads.

What I claim as new and desire to secure by Letters Patent of the United States is:

1. Apparatus for independently controlling the power supplied to two loads from a common electrical power source supplying a substantially sinusoidal waveform comprising:
   bidirectional solid state switch means connected to each of said loads for supplying electrical power to each of said loads;
   first trigger circuit means for activating said bidirectional solid state switch means to a conductive state to supply electrical power to a first one of said loads during positive half-wave cycles; said first trigger circuit means including means for electrically isolating said first trigger circuit means from said solid state switch means during negative half-wave cycles; and
   second trigger circuit means for activating said bidirectional solid state switch means to a conductive state to supply electrical power to a second one of said loads during said negative half-wave cycles; said second trigger circuit means including means for electrically isolating said second trigger circuit means from said solid state switch means during said positive half-wave cycles.

2. The invention of claim 1 wherein said first trigger circuit means comprises:
   first triggering diode means for transmitting triggering signals to said solid state switch means;
   first capacitor means for supplying voltage signals to said first triggering diode means for controlling the on/off state of said first triggering diode means; and
   first adjustable resistance means in electrical series with said first capacitor means for controlling the charging of said first capacitor means.

3. The invention of claim 2 wherein said means for isolating said first trigger circuit means comprises:
   first diode means connected in electrical parallel with said first capacitor means;
   second diode means connected in electrical series with said first capacitor means at one junction of said first capacitor means and said first diode means; and
   first resistor means connected in electrical series with said second diode means to remove voltage remaining on said first capacitor means at the end of each of said positive half-wave cycles.

4. The invention of claim 3 wherein said second trigger circuit means comprises:
   second triggering diode means for transmitting triggering signals to said solid state switch means;
   second capacitor means for supplying voltage signals to said second triggering diode means for controlling the on/off state of said second triggering diode means; and
   second adjustable resistance means in electrical series with said second capacitor means for controlling the charging of said second capacitor means.

5. The invention of claim 4 wherein said means for isolating said second trigger circuit means comprises:
   third diode means connected in electrical parallel with said second capacitor means;
   fourth diode means connected in electrical series with said second capacitor means at one junction of said second capacitor means and said third diode means; and
   second resistor means connected in electrical series with said fourth diode means to remove voltage remaining on said second capacitor means at the end of each of said negative half-wave cycles.

6. The invention of claim 5 wherein:

said bidirectional solid state switch means comprises a triac;

said first triggering diode means comprises an asymmetrical trigger diode having one terminal thereof connected to said one junction of said first capacitor means and said first diode means and having the other terminal thereof connected to the gate of said triac; and said second triggering diode means comprises a symmetrical trigger diode having one terminal thereof connected to said one junction of said second capacitor means and said third diode means and having the other terminal thereof connected to the gate of said triac.

7. The invention of claim 5 wherein:

said first adjustable resistance means comprises a first potentiometer connected to the shaft of a first wall-mounted rotatable control means; and said second adjustable resistance means comprises a second potentiometer connected to a hollow shaft of a second wall-mounted rotatable control means; said hollow shaft mounted concentric with and surrounding said shaft of said first rotatable control means.

8. The invention of claim 5 wherein:

said first load comprises a rotatable fan; and said second load comprises a lamp.

9. The invention of claim 6 wherein:

said first triggering diode comprises a diode having a turn-on voltage of 16 volts; and said second triggering diode comprises a diode having a turn-on voltage of 32 volts.

10. The invention of claim 5 wherein:

said first potentiometer comprises an arcuate resistor having an opening therein for establishing a minimum power level for electrical power supplied to said first load.

* * * * *